(12) United States Patent
Shirai et al.

(10) Patent No.: US 11,973,405 B2
(45) Date of Patent: Apr. 30, 2024

(54) STATOR FOR ROTATING ELECTRIC MACHINE AND COOLING STRUCTURE FOR STATOR

(71) Applicant: TOYOTA JIDOSHA KABUSHIKI KAISHA, Toyota (JP)

(72) Inventors: Sumio Shirai, Toyota (JP); Daichi Maruyama, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 263 days.

(21) Appl. No.: 17/533,337

(22) Filed: Nov. 23, 2021

(65) Prior Publication Data
US 2022/0190683 A1 Jun. 16, 2022

(30) Foreign Application Priority Data
Dec. 16, 2020 (JP) ................................. 2020-208103

(51) Int. Cl.
*H02K 9/19* (2006.01)
*H02K 3/24* (2006.01)
*H02K 5/20* (2006.01)

(52) U.S. Cl.
CPC ................ *H02K 9/19* (2013.01); *H02K 3/24* (2013.01); *H02K 5/203* (2021.01)

(58) Field of Classification Search
USPC .............................................. 310/54, 58, 59
See application file for complete search history.

(56) References Cited

U.S. PATENT DOCUMENTS

| 6,856,053 | B2* | 2/2005 | LeFlem ................. | H02K 9/197 310/194 |
| 7,538,457 | B2* | 5/2009 | Holmes .................... | H02K 9/19 310/57 |
| 10,135,319 | B2* | 11/2018 | Hanumalagutti ........ | B60K 1/00 |
| 10,536,055 | B2* | 1/2020 | Hanumalagutti ........ | H02K 3/24 |
| 11,368,078 | B2* | 6/2022 | Tangudu .................. | H02K 3/28 |
| 2004/0145252 | A1* | 7/2004 | Arimitsu ................. | B60L 50/16 310/58 |
| 2011/0215660 | A1* | 9/2011 | Goto ...................... | H02K 5/203 310/53 |

FOREIGN PATENT DOCUMENTS

JP 5286397 B2 9/2013

* cited by examiner

*Primary Examiner* — Quyen P Leung
*Assistant Examiner* — Minki Chang
(74) *Attorney, Agent, or Firm* — Oliff PLC (57) ABSTRACT

A stator for a rotating electric machine includes a stator core, a coil having a coil end, a cooling jacket that is attached to the stator core so as to house the coil end in the cooling jacket and that allows cooling oil to flow therethrough, introduction parts, and discharge parts. The coil end includes first portions, extending parallel to an end surface of the stator core, and pairs of second portions, each pair being connected to both ends of a corresponding one of the first portions, the pairs extending in a direction parallel to an axial direction. The cooling jacket includes an inner circumferential wall and an outer circumferential wall. The introduction parts are provided on the outer circumferential wall, and the discharge parts are provided on the inner circumferential wall.

5 Claims, 7 Drawing Sheets

STATOR FOR ROTATING ELECTRIC MACHINE AND COOLING STRUCTURE FOR STATOR

This nonprovisional application is based on Japanese Patent Application No. 2020-208103 filed on Dec. 16, 2020 with the Japan Patent Office, the entire contents of which are hereby incorporated by reference.

BACKGROUND

Field

The present disclosure relates to a stator for a rotating electric machine and a cooling structure for a stator.

Description of the Background Art

As a conventional stator for a rotating electric machine, Japanese Patent No. 5286397 discloses a stator in which coil ends projecting from both ends of a stator core in an axial direction are approximately U-shaped while being directed in the axial direction.

SUMMARY

In a conceivable structure, for the purpose of cooling coil ends, cooling jackets are provided at both ends of a stator core in an axial direction to cover the end coils, thereby passing cooling oil into the cooling jackets. When the coil ends are approximately U-shaped while being directed in the axial direction as disclosed in Japanese Patent No. 5286397, the frame of the stator can be reduced in size, but the coil ends become denser, resulting in a smaller clearance between the coil ends in the radial direction of the stator. If the cooling jackets are provided without any measure taken, thus, the cooling oil flows preferentially between the coil ends located at both ends in the radial direction of the stator and the cooling jackets. In such a case, the cooling oil fails to sufficiently reach minute portions of the coil ends, and accordingly, the cooling performance of the coil ends may decrease.

The present disclosure has been made in view of the above problem. An object of the present disclosure is to provide a stator and a cooling structure for a rotating electric machine that are capable of improving the cooling performance of coil ends.

A stator for a rotating electric machine according to the present disclosure includes: a stator core having a first end and a second end in an axial direction; a coil having coil ends each projecting outward from a corresponding one of the first end and the second end, the coil being attached to the stator core; cooling jackets each attached to a corresponding one of the first end and the second end of the stator core so as to house a corresponding one of the coil ends in each cooling jacket, the cooling jackets allowing cooling oil to flow therethrough; a plurality of introduction parts that introduce the cooling oil into the cooling jackets; and a plurality of discharge parts that discharge, from the cooling jackets, the cooling oil that has cooled the coil ends. Each of the coil ends includes a plurality of first portions and a plurality of pairs of second portions, the plurality of first portions extending parallel to an end surface of the stator core in the axial direction, each pair of the plurality of pairs of second portions being connected to both ends of a corresponding one of the plurality of first portions in a direction in which the plurality of first portions extend, the plurality of pairs of second portions extending in a direction parallel to the axial direction. Each of the cooling jackets includes an inner circumferential wall and an outer circumferential wall facing each other in a direction parallel to a radial direction of the stator core. The plurality of introduction parts are provided on the outer circumferential wall to be aligned in a circumferential direction of the stator core. The plurality of discharge parts are provided on the inner circumferential wall to be aligned in the circumferential direction of the stator core.

As in the above configuration, the coil end includes the plurality of first portions extending parallel to the end surface of the stator core and the plurality of pair of second portions, each pair connected to both ends of a corresponding one of the plurality of first portions, the plurality of second portions extending in the direction parallel to the axial direction. Accordingly, the plurality of first portions can be arranged densely.

In such a case, the plurality of introduction parts are provided on the outer circumferential wall of the cooling jacket to be aligned in the circumferential direction of the stator core, and the plurality of discharge parts are provided on the inner circumferential wall of the cooling jacket to be aligned in the circumferential direction of the stator core. Accordingly, a flow of the cooling oil can be changed to cause the cooling oil to flow from the outer circumferential side to the inner circumferential side of the cooling jacket. This allows ingress of the cooling oil into the coil end, thus causing the cooling oil to cool a minute portion of the coil end. As a result, the cooling performance of the coil end can be improved.

In the stator for a rotating electric machine according to the present disclosure, the plurality of introduction parts and the plurality of discharge parts may be provided at different positions in the axial direction.

With the above configuration, a difference in slope between the plurality of introduction part and the plurality of discharge part allows the cooling oil to flow in the coil end more easily also in the axial direction. This can further improve the performance of the coil end.

In the stator for a rotating electric machine according to the present disclosure, the plurality of introduction parts and the plurality of discharge parts may be provided at different positions in the circumferential direction.

With the above configuration, the cooling oil is allowed to flow from the outer circumferential side to the inner circumferential side of the cooling jacket while flowing in the circumferential direction of the stator core. This can further improve the cooling performance of the coil end.

In the stator for a rotating electric machine according to the present disclosure, the plurality of introduction parts and the plurality of discharge parts may be arranged alternately in the circumferential direction.

With the above configuration, the cooling oil is allowed to flow more effectively, and accordingly, the cooling performance of the coil end can be improved.

A cooling structure for a stator according to the present disclosure includes: a stator for a rotating electric machine described above; and a circulation circuit connected to the plurality of introduction parts and the plurality of discharge parts, the circulation circuit causing the cooling oil to circulate to the cooling jackets.

With the above configuration, the cooling oil cooled in the circulation circuit is allowed to circulate to the cooling jackets.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Embodiments of the present disclosure will be described below in detail with reference to the accompanying drawings. It should be noted that in the embodiments described below, the same or corresponding parts are denoted by the same reference characters and will not be described repeatedly. In the embodiments described below, when reference is made to number, amount, and the like, the scope of the present disclosure is not necessarily limited to the number, amount, and the like unless otherwise stated.

Embodiment 1

Figure 1:
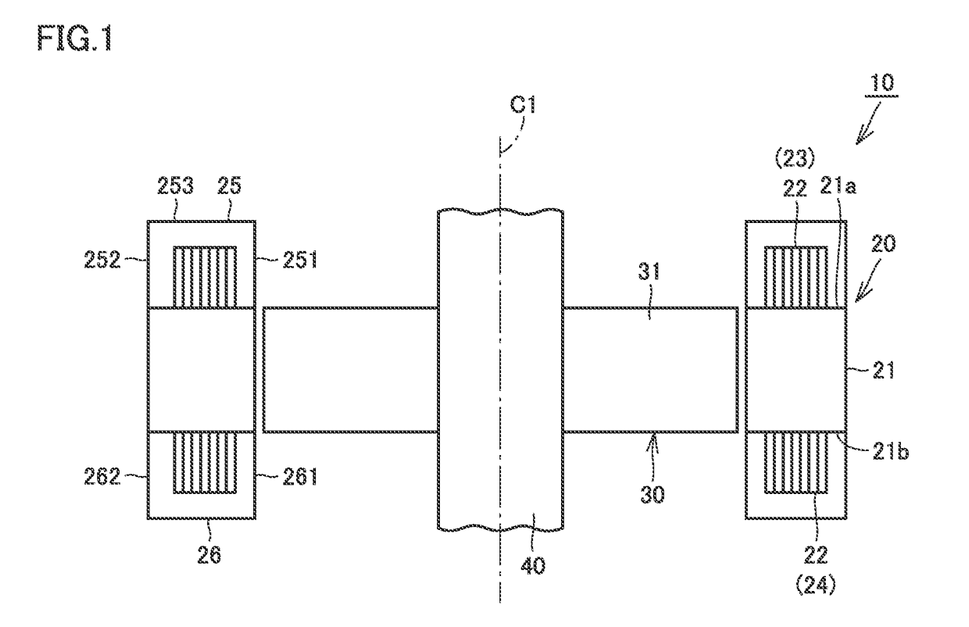
FIG. 1 schematically shows a rotating electric machine according to Embodiment 1.

FIG. 1 schematically shows a rotating electric machine according to Embodiment 1. A rotating electric machine 10 according to Embodiment 1 will be described with reference to FIG. 1.

As shown in FIG. 1, rotating electric machine 10 includes a stator 20, a rotor 30, and a shaft 40.

Stator 20, rotor 30, and shaft 40 are housed in a housing (not shown), and shaft 40 is rotatably supported by the housing. A stator core 21 included in stator 20, which will be described below, is fixed to the housing by a fixing member.

Shaft 40 is fixed to a rotor core 31, which will be described below. As shaft 40 rotates about an axis Cl, rotor core 31 rotates integrally with shaft 40.

Rotor 30 includes rotor core 31. Rotor core 31 is formed of a plurality of magnetic steel sheets stacked in an axis Cl direction. Rotor core 31 has a plurality of holes passing therethrough in a direction parallel to the axis Cl direction. A permanent magnet is inserted into each of the plurality of holes.

Stator 20 includes stator core 21, a coil 22, and cooling jackets 25, 26.

Stator core 21 has an approximately cylindrical shape and has a first end 21a and a second end 21b in the axial direction. Stator core 21 is formed of a plurality of annular plates stacked in the axis Cl direction. The annular plates are formed by, for example, punching of electromagnetic steel sheets. Stator core 21 is disposed coaxially with shaft 40 on the outer circumferential side of rotor core 31.

Stator core 21 has a plurality of groove-shaped slots extending radially from the inner circumferential side to the outer circumferential side. Stator core 21 includes a teeth portion at a position between slots adjacent to each other circumferentially.

Coil 22 is provided in accordance with the circuit design of three-phase alternating-current type and includes a U-phase coil, a V-phase coil, and a W-phase coil. Coil 22 is attached to stator core 21. Specifically, coil 22 is attached to the slots described above. The U-phase coil, V-phase coil, and W-phase coil included in coil 22 are fixed at installation positions predetermined in correspondence with three phases, that is, U-phase, V-phase, and W-phase.

Coil 22 includes a coil end 23, which projects outward from first end 21a of stator core 21, and a coil end 24, which projects outward from second end 21b of stator core 21.

Cooling jacket 25 is attached to first end 21a of stator core 21 in a liquid tight manner so as to house coil end 23 in cooling jacket 25. Cooling jacket 25 is provided annularly. Cooling oil flows in cooling jacket 25, thereby cooling coil end 23.

Cooling jacket 26 is attached to second end 21b of stator core 21 in a liquid tight manner so as to house coil end 24 in cooling jacket 26. Cooling jacket 26 is provided annularly. The cooling oil flows in cooling jacket 26, thereby cooling coil end 24.

Figure 2:
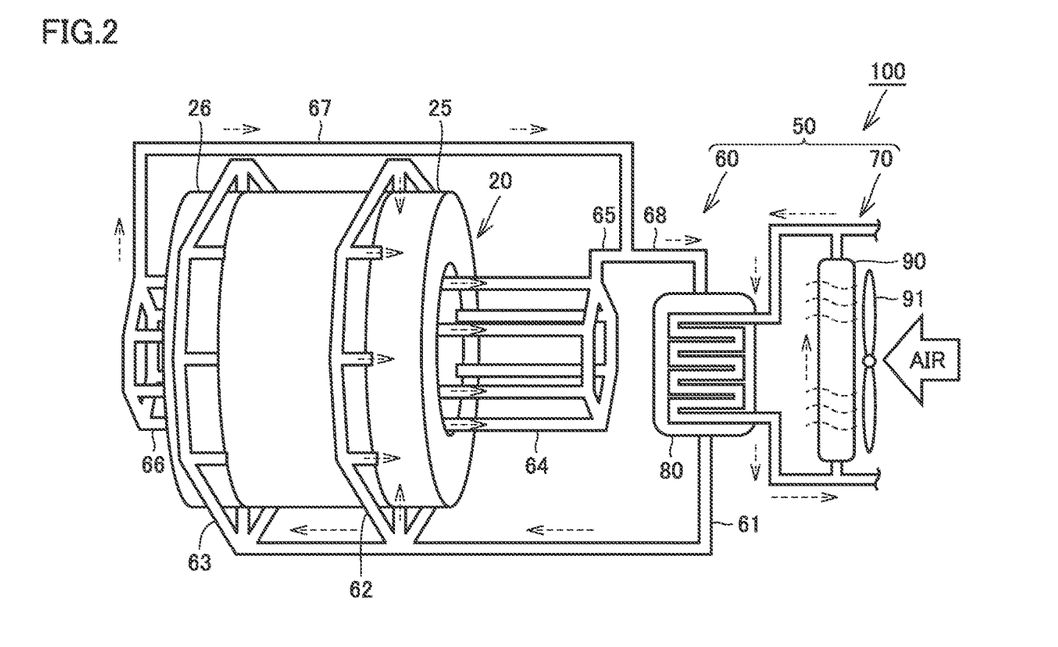
FIG. 2 schematically shows a cooling structure for a stator according to Embodiment 1.

FIG. 2 schematically shows a cooling structure for a stator according to Embodiment 1. The cooling structure for a stator according to Embodiment 1 will be described with reference to FIG. 2.

As shown in FIG. 2, the cooling structure for a stator according to Embodiment 1 includes stator 20 and a cooling system 50. Cooling system 50 is a system for cooling stator 20.

Cooling system 50 includes a first circulation circuit 60 and a second circulation circuit 70. First circulation circuit 60 is configured to allow the cooling oil to circulate therethrough. More specifically, first circulation circuit 60 is provided such that the cooling oil circulates between a heat exchange part 80, which serves as a cooling part, and cooling jackets 25, 26.

First circulation circuit 60 includes a flow channel 61, annular flow channels 62, 63, collecting flow channels 64, 66, and flow channels 65, 67, 68.

The upstream end of flow channel 61 in the direction in which the cooling oil flows is connected to heat exchange part 80. Flow channel 61 branches into annular flow channels 62, 63.

Annular flow channel 62 is provided to surround cooling jacket 25. Annular flow channel 62 is connected to a plurality of introduction parts 255 (see FIG. 4) provided on an outer circumferential wall 252 (see FIG. 1) of cooling jacket 25.

The cooling oil introduced into cooling jacket 25 by introduction parts 255 is discharged to collecting flow channel 64 from a plurality of discharge parts 256 (see FIG. 4) provided on inner circumferential wall 251 (see FIG. 1) of cooling jacket 25.

Collecting flow channels 64 are provided in correspondence with the number of discharge parts 256. The upstream end of collecting flow channel 64 in the direction in which the cooling oil flows is connected to discharge part 256. Each of the downstream ends of the collecting flow channels 64 in the direction in which the cooling oil flows is provided to join flow channel 65.

Annular flow channel 63 is provided to surround cooling jacket 26. Annular flow channel 63 is connected to a plurality of introduction parts provided on an outer circumferential wall 262 (see FIG. 1) of cooling jacket 26.

The cooling oil introduced into cooling jacket 26 by the plurality of introduction parts is discharged to collecting flow channel 66 from a plurality of discharge parts provided on an inner circumferential wall 261 (FIG. 1) of cooling jacket 26.

Collecting flow channels 66 are provided in correspondence with the number of discharge parts. The upstream end of collecting flow channel 66 in the direction in which the cooling oil flows is connected to the discharge part. Each of the downstream ends of the collecting flow channels 66 in the direction in which the cooling oil flows is provided to join flow channel 67.

Flow channel 65 and flow channel 67 described above join flow channel 68. The downstream end of flow channel 68 in the direction in which the cooling oil flows is connected to heat exchange part 80. Heat exchange part 80 is, for example, an oil cooler.

The cooling oil flowing through heat exchange part 80 is cooled through heat exchange with refrigerant flowing through second circulation circuit 70.

Second circulation circuit 70 is configured to allow cooling water serving as refrigerant to circulate therethrough. Specifically, second circulation circuit 70 is provided to allow the cooling water to circulate between a radiator 90 and heat exchange part 80.

Part of the cooling water heated through heat exchange with the cooling oil in heat exchange part 80 is introduced into radiator 90. Radiator 90 performs heat exchange between the air (outside air) blown from a cooling fan 91 and the cooling water flowing in radiator 90, thereby cooling the cooling water.

Figure 3:
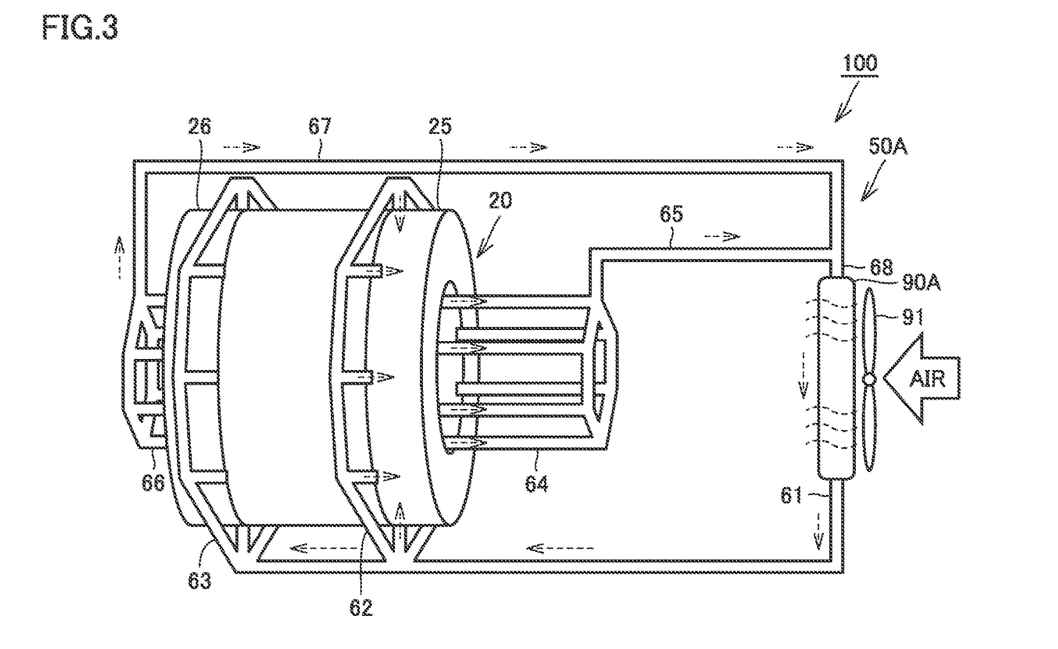
FIG. 3 schematically shows a variation of the cooling structure for a stator according to Embodiment 1.

FIG. 3 schematically shows a variation of the cooling structure for a stator according to Embodiment 1. The variation of the cooling structure for a stator will be described with reference to FIG. 3.

As shown in FIG. 3, in a cooling system 50A, second circulation circuit 70 is not provided, and a radiator 90A is provided as a cooling part in first circulation circuit 60, in place of heat exchange part 80. In this case, first circulation circuit 60 is provided to allow the cooling oil to circulate between radiator 90A serving as the cooling part and cooling jackets 25, 26, and the cooling oil flowing through radiator 90A is cooled by the air blown from cooling fan 91.

Figure 4:
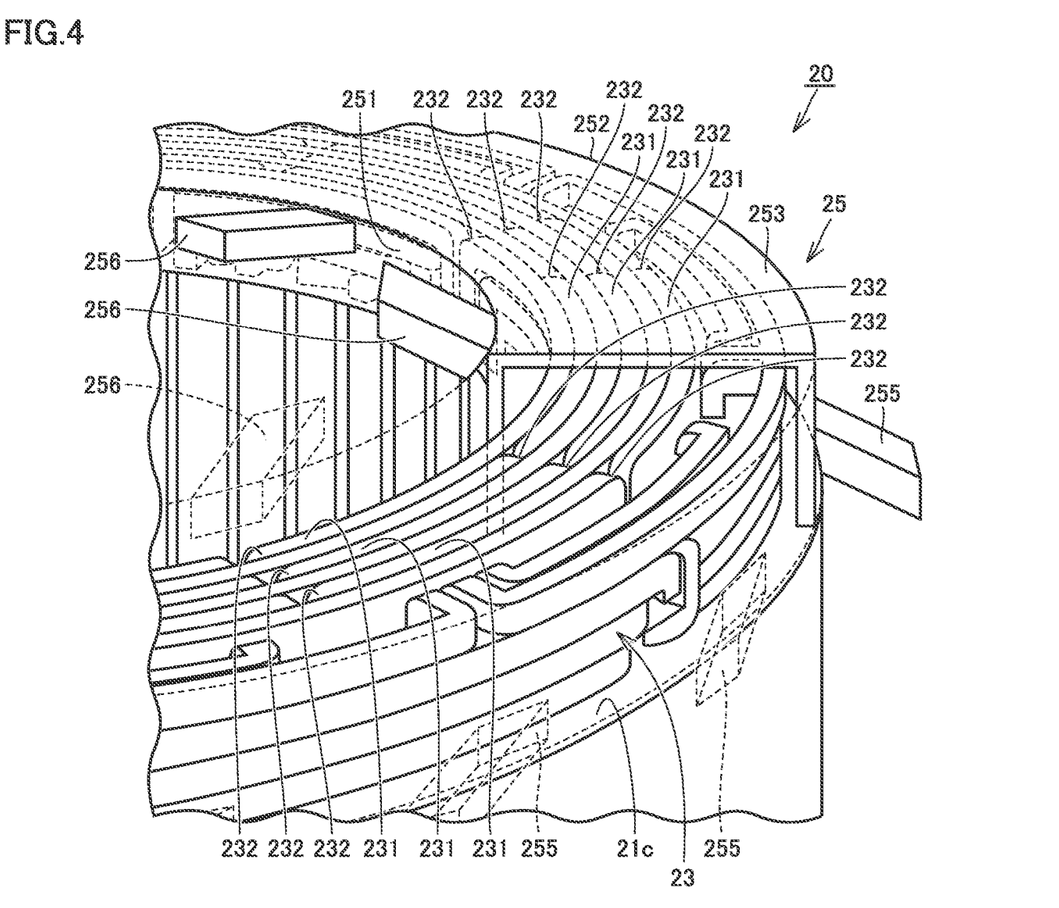
FIG. 4 is a partial schematic view of the stator according to Embodiment 1.

FIG. 4 is a partial schematic view of the stator according to Embodiment 1. Stator 20 will be described in detail with reference to FIG. 4. For convenience of description, cooling jacket 25 is indicated by the broken line and coil end 23 is indicated by the solid line on the lower side of FIG. 4, and cooling jacket 25 is indicated by the solid line and coil end 23 is indicated by the broken line on the upper side of FIG. 4.

Since coil 22 has a substantially identical structure on the first end side and on the second end side in the axial direction, herein, cooling jacket 25 and coil end 23 that are located on the first end side of coil 22 will be described in detail, and detailed description of cooling jacket 26 and coil end 24 that are located on the second end side of coil 22 will be omitted.

As shown in FIG. 4, coil end 23 includes a plurality of first portions 231 and a plurality of pairs of second portions 232. Each of first portions 231 extends parallel to an end surface 21c of stator core 21. Each of first portions 231 extends in the circumferential direction of stator core 21. First portions 231 are arranged to be aligned in the radial direction of stator core 21 and are arranged to be aligned in the circumferential direction of stator core 21.

The pair of second portions 232 is provided to each of first portions 231. The pair of second portions 232 is connected to both ends of first portion 231 in the direction in which first portion 231 extends and extend in the direction parallel to the axis Cl direction.

Cooling jacket 25 includes an inner circumferential wall 251, an outer circumferential wall 252, and a connecting wall 253. Inner circumferential wall 251 and outer circumferential wall 252 face each other in the direction parallel to the radial direction of stator core 21. Connecting wall 253 connects inner circumferential wall 251 to outer circumferential wall 252 and faces end surface 21c of stator core 21.

Introduction parts 255 are provided on outer circumferential wall 252. The cooling oil is introduced from each of introduction parts 255 into cooling jacket 25. Introduction parts 255 are provided to be aligned in the circumferential direction of stator core 21. Each of introduction parts 255 is provided on the end surface 21c side of stator core 21.

Discharge parts 256 are provided on inner circumferential wall 251. The cooling oil which has been introduced into cooling jacket 25 and has cooled coil end 23 is discharged from each of discharge parts 256. Each of discharge parts 256 is provided on the connecting wall 253 side.

Introduction parts 255 are provided to be located at substantially identical positions in the axial direction of stator core 21. Discharge parts 256 are provided to be located at substantially identical positions in the axial direction of stator core 21. On the other hand, introduction parts 255 and discharge parts 256 are provided to be located at different positions in the axial direction. Introduction parts 255 and discharge parts 256 are also provided at different positions in the circumferential direction of stator core 21. Further, introduction parts 255 and discharge parts 256 are arranged alternately in the circumferential direction.

Figure 5:
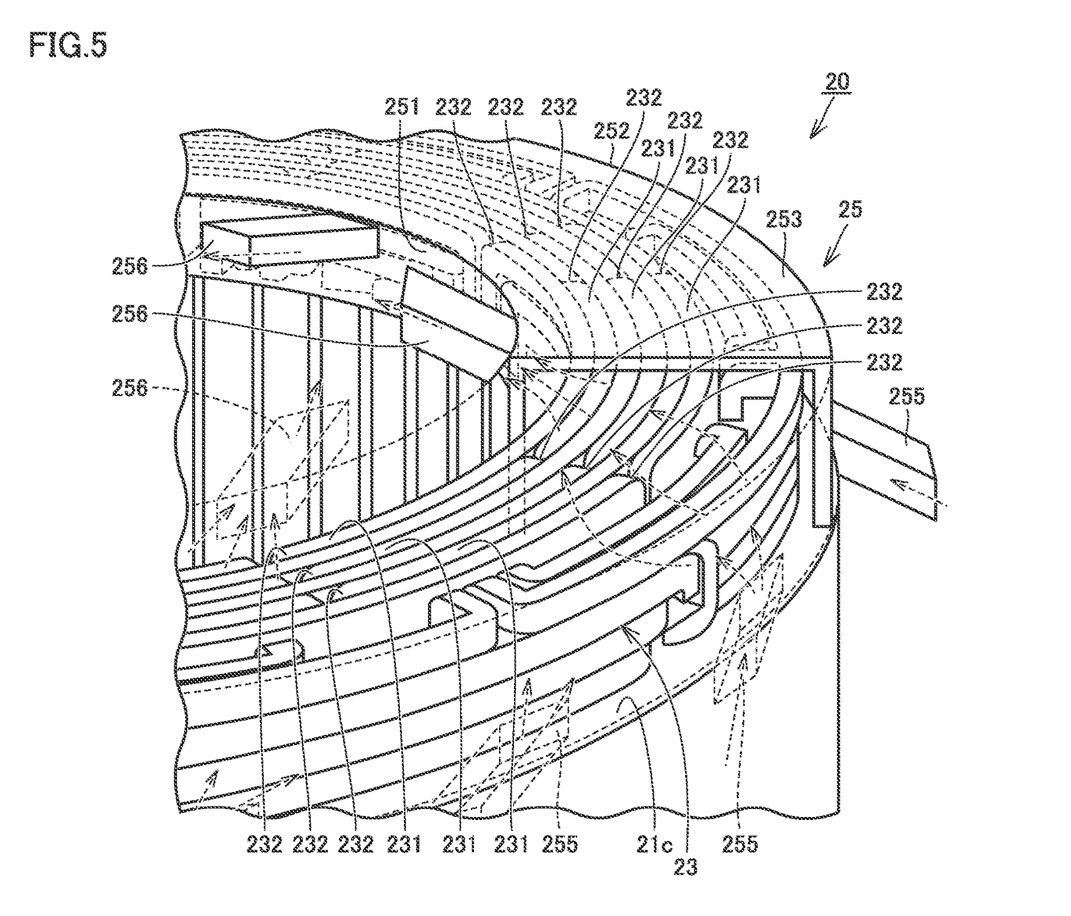
FIG. 5 is a schematic view showing how cooling oil flows in a cooling jacket according to Embodiment 1.
Figure 6:
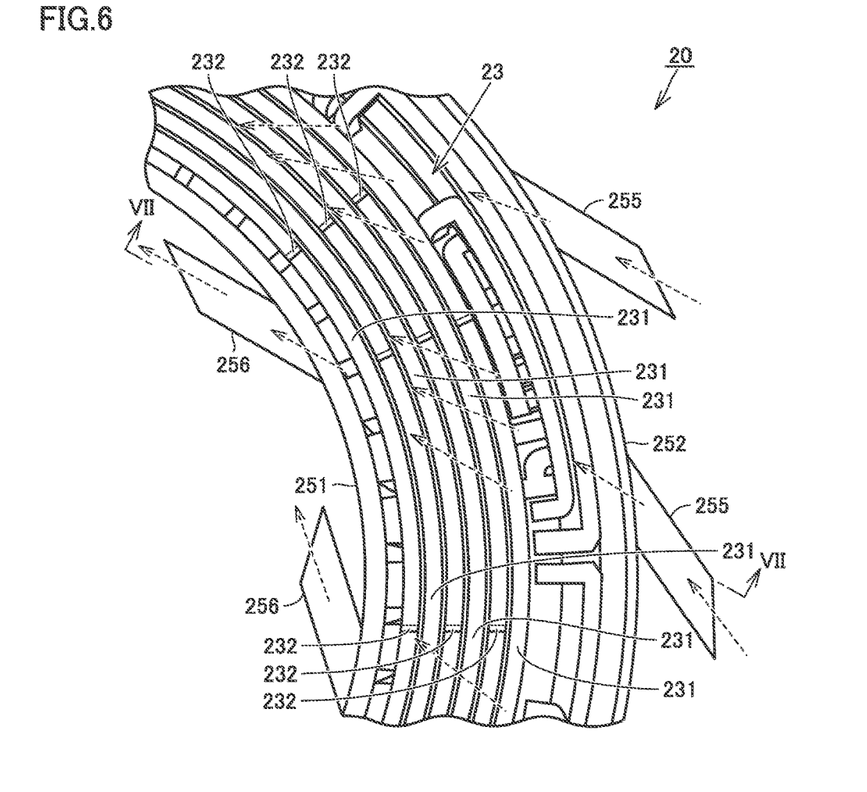
FIG. 6 is a plan view showing how cooling oil flows in the cooling jacket according to Embodiment 1.
Figure 7:
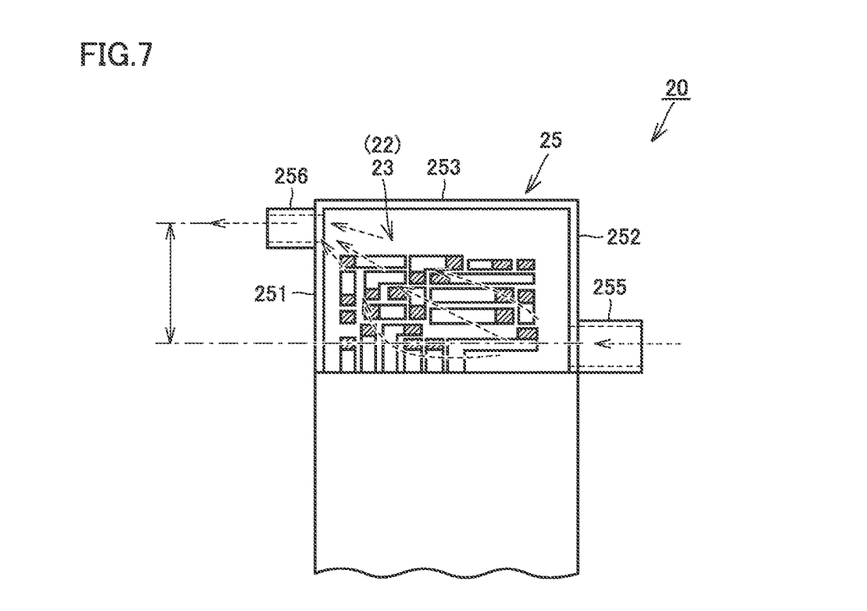
FIG. 7 is a longitudinal sectional view showing how cooling oil flows in the cooling jacket according to Embodiment 1.

FIGS. 5 to 7 are a schematic view, a plan view, and a longitudinal sectional view showing how the cooling oil flows in the cooling jacket according to Embodiment 1, respectively.

As shown in FIGS. 5 to 7, introduction parts 255 are provided on outer circumferential wall 252 of cooling jacket 25 to be aligned in the circumferential direction of the stator core, and discharge parts 256 are provided on inner circumferential wall 251 of cooling jacket 25 to be aligned in the circumferential direction of stator core 21. This can change a flow of the cooling oil to cause the cooling oil to flow from the outer circumference side to the inner circumferential side of cooling jacket 25.

Herein, as described above, coil end 23 includes first portions 231, extending parallel to end surface 21c of stator core 21, and the pairs of second portions 232, each connected to both ends of a corresponding one of first portions 231, the pairs of second portions 232 extending in the direction parallel to the axial direction. Accordingly, first portions 231 are arranged densely.

In such a situation, the flow of the cooling oil is changed as described above to cause the cooling oil to flow from the outer circumference side to the inner circumferential side of cooling jacket 25, allowing ingress of the cooling oil into coil end 23, thus cooling a minute portion of coil end 23 by the cooling oil. As a result, the cooling performance of the coil end can be improved.

As introduction parts 255 and discharge parts 256 are provided to be located at different positions in the axial direction of stator core 21, a difference in slope between introduction parts 255 and discharge parts 256 allows the cooling oil to flow through coil end 23 more easily also in the axial direction. Accordingly, the cooling performance of coil end 23 can be improved further.

Further, as introduction parts 255 and discharge parts 256 are provided to be located at different positions in the circumferential direction, the cooling oil is allowed to flow from the outer circumferential side to the inner circumferential side of cooling jacket 25 while flowing in the circumferential direction of stator core 21. As a result, the cooling performance of the coil end can be improved further.

In addition, as introduction parts 255 and discharge parts 256 are arranged alternately in the circumferential direction of stator core 21, the cooling oil is allowed to flow effectively. Accordingly, the cooling performance of coil end 23 can be improved further.

Figure 8:
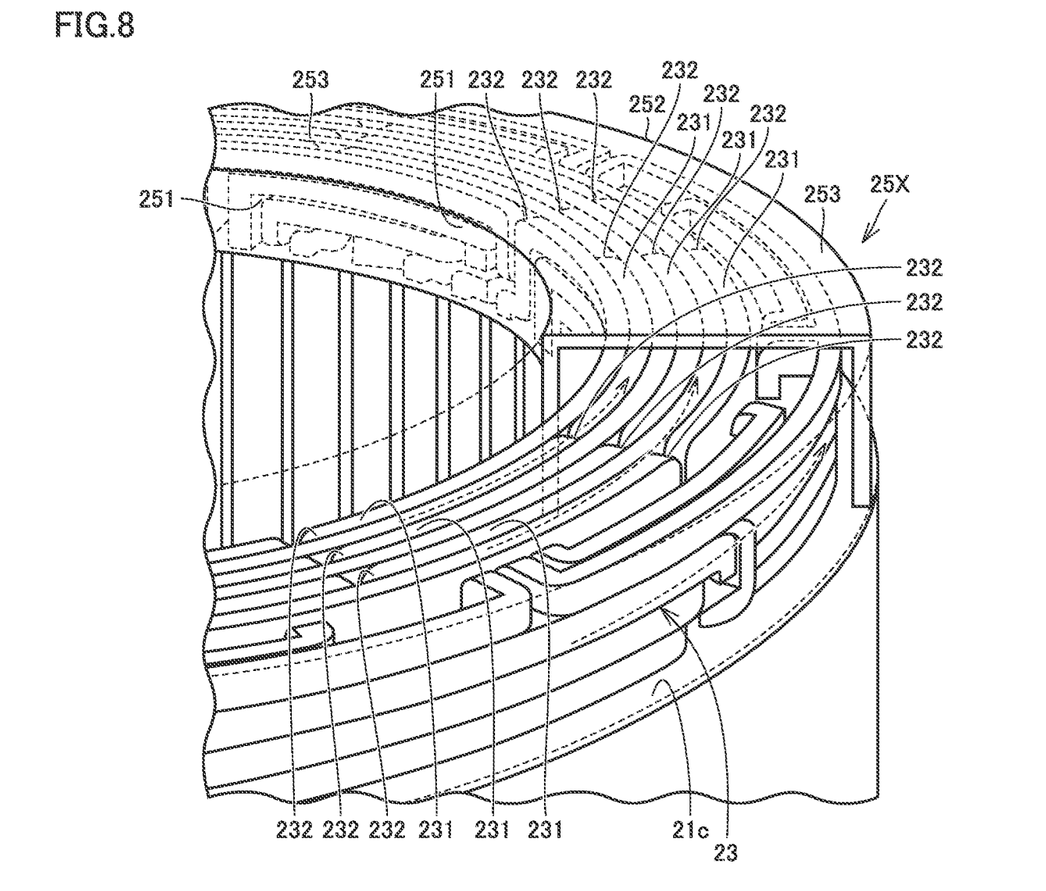
FIG. 8 schematically shows how cooling oil flows in a cooling jacket in a comparative example.

FIG. 8 schematically shows how the cooling oil flows in a cooling jacket in a comparative example. How the cooling oil flows in a cooling jacket 25X in the comparative example will be described with reference to FIG. 8.

In cooling jacket 25X of the comparative example, discharge parts 256 are not provided on inner circumferential wall 251, and introduction parts 255 are not provided on outer circumferential wall 252. When the cooling oil is caused to flow in cooling jacket 25X, thus, the cooling oil flowing between the end of coil end 23 which is located inside of stator core 21 in radial direction and inner circumferential wall 251 of cooling jacket 25X flows in the circumferential direction of stator core 21.

Similarly, the cooling oil flowing between the end of coil end 23 which is located outside of stator core 21 in the radial direction and outer circumferential wall 252 of cooling jacket 25X flows in the circumferential direction of stator core 21.

In the comparative example, thus, the cooling oil does not sufficiently reach a minute portion of coil end 23, thus reducing the cooling performance of the coil end.

Embodiment 2

Figure 9:
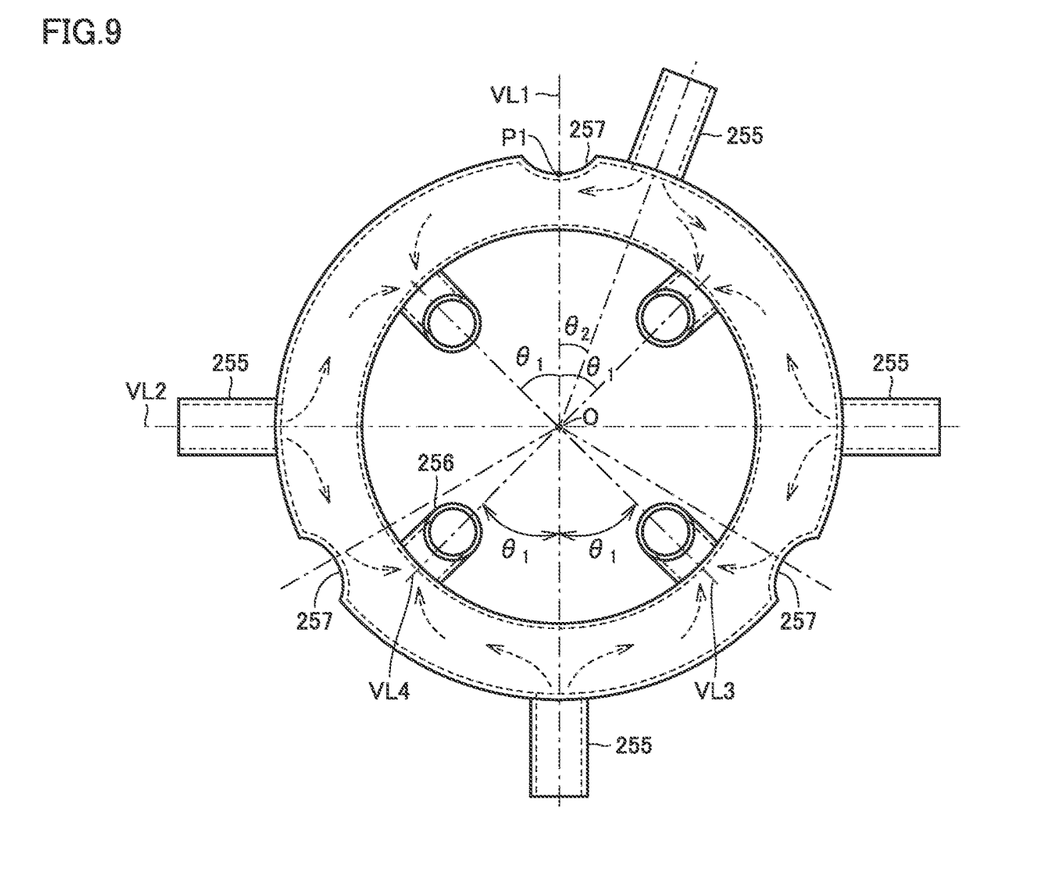
FIG. 9 is a plan view of a cooling jacket included in a stator according to Embodiment 2.

FIG. 9 is a plan view of a cooling jacket included in a stator according to Embodiment 2. The stator according to Embodiment 2 will be described with reference to FIG. 9.

As shown in FIG. 9, in comparison, the stator according to Embodiment 2 is different from stator 20 according to Embodiment 1 in the configuration of the cooling jacket. Also in the present embodiment, since coil 22 has a substantially identical structure on the first end side and on the second end side in the axial direction, herein, cooling jacket 25A located on the first end side of coil 22 will be described, and description of the cooling jacket located on the second end side of coil 22 will be omitted.

In comparison, cooling jacket 25A is different from cooling jacket 25 according to Embodiment 1 in the number and arrangement of introduction parts 255 and discharge parts 256 and in that a plurality of rectifier parts 257 are provided. The other configuration is substantially identical.

In cooling jacket 25A, four introduction parts 255 are provided as introduction parts 255. Also, four discharge parts 256 are provided as discharge parts 256, and three rectifier parts 257 are provided as rectifier parts 257.

In FIG. 9, in a plane passing through a central axis O of stator core 21 and perpendicular to central axis O, two lines that evenly divide cooling jacket 25A into four areas are a first virtual line VL1 and a second virtual line VL2.

The respective four introduction parts 255 are located counterclockwise at 90 degrees, 180 degrees, 270 degrees, and 360-θ3 degrees from a position P1 at which first virtual line VL1 intersects outer circumferential wall 252 of the cooling jacket. In other words, one introduction part 255 among four introduction parts 255 is located at a position offset in the circumferential direction of stator core 21 from the position in the case of even arrangement in the circumferential direction of stator core 21. Note that θ2 is smaller than 45 degrees. More specifically, θ2 can be smaller than 30 degrees, and can be approximately 20 degrees.

The four respective discharge parts 256 are located counterclockwise at 45 degrees, 135 degrees, 225 degrees, and 315 degrees with respect to a line of first virtual line VL1 which connects central axis O to position P1. Four discharge parts 256 are arranged evenly in the circumferential direction of stator core 21, and in FIG. 9, an angle θ1 is approximately 45 degrees. Angle θ1 is a smaller one of the angles formed between first virtual line VL1 and virtual lines VL3 and VL4, each of which connects the centers of discharge parts 256 opposite to each other in the radial direction of stator core 21.

Rectifier parts 257 are arranged to be aligned in the circumferential direction of stator core 21. Rectifier part 257 is arranged between any of introduction parts 255 and any of discharge parts 256 arranged alternately in the circumferential direction.

The three respective rectifier parts 257 are located counterclockwise at 0 degrees, 120 degrees, and 240 degrees with respect to the line of first virtual line VL1 which connects central axis O to position P1. Three rectifier parts 257 are arranged evenly in the circumferential direction of stator core 21.

Rectifier part 257 is provided such that part of outer circumferential wall 252 is recessed inward in the radial direction of stator core 21. Rectifier part 257 is curved like a circular arc. As such rectifier parts 257 are provided, a flow of the cooling oil can be changed such that the cooling oil flows toward inner circumferential wall 251.

Substantially similar effects to those of Embodiment 1 are obtained even when the cooling jackets are configured as described above.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A stator for a rotating electric machine, the stator comprising:
 a stator core having a first end and a second end in an axial direction;
 a coil having coil ends each projecting outward from a corresponding one of the first end and the second end, the coil being attached to the stator core;
 cooling jackets each attached to a corresponding one of the first end and the second end of the stator core so as to house a corresponding one of the coil ends in each cooling jacket, the cooling jackets allowing cooling oil to flow therethrough;

a plurality of introduction parts that introduce the cooling oil into the cooling jackets; and a plurality of discharge parts that discharge, from the cooling jackets, the cooling oil that has cooled the coil ends, each of the coil ends including a plurality of first portions and a plurality of pairs of second portions, the plurality of first portions extending parallel to an end surface of the stator core in the axial direction, each pair of the plurality of pairs of second portions being connected to both ends of a corresponding one of the plurality of first portions in a direction in which the plurality of first portions extend, the plurality of pairs of second portions extending in a direction parallel to the axial direction, each of the cooling jackets including an inner circumferential wall and an outer circumferential wall facing each other in a direction parallel to a radial direction of the stator core, the plurality of introduction parts being provided on the outer circumferential wall to be aligned in a circumferential direction of the stator core, the plurality of discharge parts being provided on the inner circumferential wall to be aligned in the circumferential direction of the stator core.

2. The stator for the rotating electric machine according to claim 1, wherein the plurality of introduction parts and the plurality of discharge parts are provided at different positions in the axial direction.

3. The stator for the rotating electric machine according to claim 1, wherein the plurality of introduction parts and the plurality of discharge parts are provided at different positions in the circumferential direction.

4. The stator for the rotating electric machine according to claim 3, wherein the plurality of introduction parts and the plurality of discharge parts are arranged alternately in the circumferential direction.

5. A cooling structure for a stator, comprising:

the stator for the rotating electric machine according to claim 1; and a circulation circuit connected to the plurality of introduction parts and the plurality of discharge parts, the circulation circuit causing the cooling oil to circulate to the cooling jackets.

* * * * *